(12) United States Patent
Smith

(10) Patent No.: US 6,680,607 B2
(45) Date of Patent: Jan. 20, 2004

(54) METHOD OF DETECTING STEADY-STATE CONVERGENCE OF A SIGNAL

(75) Inventor: James Craig Smith, Farmington Hills, MI (US)

(73) Assignee: Delphi Technologies, Inc., Troy, MI (US)

(*) Notice: Subject to any disclaimer, the term of this patent is extended or adjusted under 35 U.S.C. 154(b) by 70 days.

(21) Appl. No.: 10/146,195

(22) Filed: May 15, 2002

(65) Prior Publication Data

US 2003/0214281 A1 Nov. 20, 2003

(51) Int. Cl.[7] .......................... G01R 29/00; G05B 13/02
(52) U.S. Cl. ..................... 324/76.79; 324/618; 700/45; 702/189; 702/190
(58) Field of Search ............................. 324/76.79, 618; 700/45; 702/189, 190

(56) References Cited

U.S. PATENT DOCUMENTS 5,162,744 A * 11/1992 Koozer ........................ 324/618
5,541,520 A * 7/1996 Zai et al. ..................... 324/618
6,469,856 B1 * 10/2002 Mitchell et al. .............. 360/65

* cited by examiner

*Primary Examiner*—N. Le
*Assistant Examiner*—Timothy J. Dole
(74) *Attorney, Agent, or Firm*—Jimmy L. Funke

(57) ABSTRACT

A method for detecting steady-state convergence of a signal compares a filtered version of the signal or its derivative to a threshold over a given time interval, and a measure of the signal variability is used to tune the filter behavior. In one implementation, the signal is filtered with a high-pass filter, and the cut-off frequency of the filter is adjusted inversely with respect to the measured variability of the signal. In another implementation, the signal derivative is filtered with a low-pass filter, and the cut-off frequency of the filter is adjusted in proportion to the measured variability of the signal. In each case, the variability of the signal is measured by computing a differential of the signal and then smoothing the differential.

5 Claims, 2 Drawing Sheets

METHOD OF DETECTING STEADY-STATE CONVERGENCE OF A SIGNAL

TECHNICAL FIELD

This invention relates to a signal processing method for control purposes, and more particularly to a method of detecting convergence of a signal on a steady-state value.

BACKGROUND OF THE INVENTION

In many feedback control systems, it is useful for purposes of stability enhancement to determine Whether and when a system parameter being controlled has converged to a steady-state or quasi-steady-state value. When convergence is detected, for example, the feedback control gains may be modified, and/or the current control value may be stored for feed-forward control when similar operating conditions are re-encountered. However, the detection of steady-state convergence is not a trivial matter because the variability that occurs in a converged signal is often difficult to distinguish from the variability that occurs prior to convergence. And yet, it is important to identify convergence of the signal as soon as possible in order to achieve the stability enhancement, particularly in a system where the operating conditions can quickly change. Accordingly, what is needed is a method for quickly and reliably detecting steady-state convergence of a signal.

SUMMARY OF THE INVENTION

The present invention is directed to an improved method for detecting steady-state convergence of a signal by comparing a filtered version of the signal or its numerical derivative to a threshold over a given time interval, wherein a measure of the signal variability is used to tune the filter behavior. In a first embodiment of the invention, a derivative of the signal is filtered with a low-pass filter, and the cut-off frequency of the filter is adjusted in proportion to the measured variability of the signal. In a second embodiment of the invention, the signal is filtered With a high-pass filter, and the cut-off frequency of the filter is adjusted inversely with respect to the measured variability of the signal. In each case, the variability of the signal is measured by computing a differential of the signal and then smoothing the differential.

DESCRIPTION OF THE PREFERRED EMBODIMENT

Figure 1:
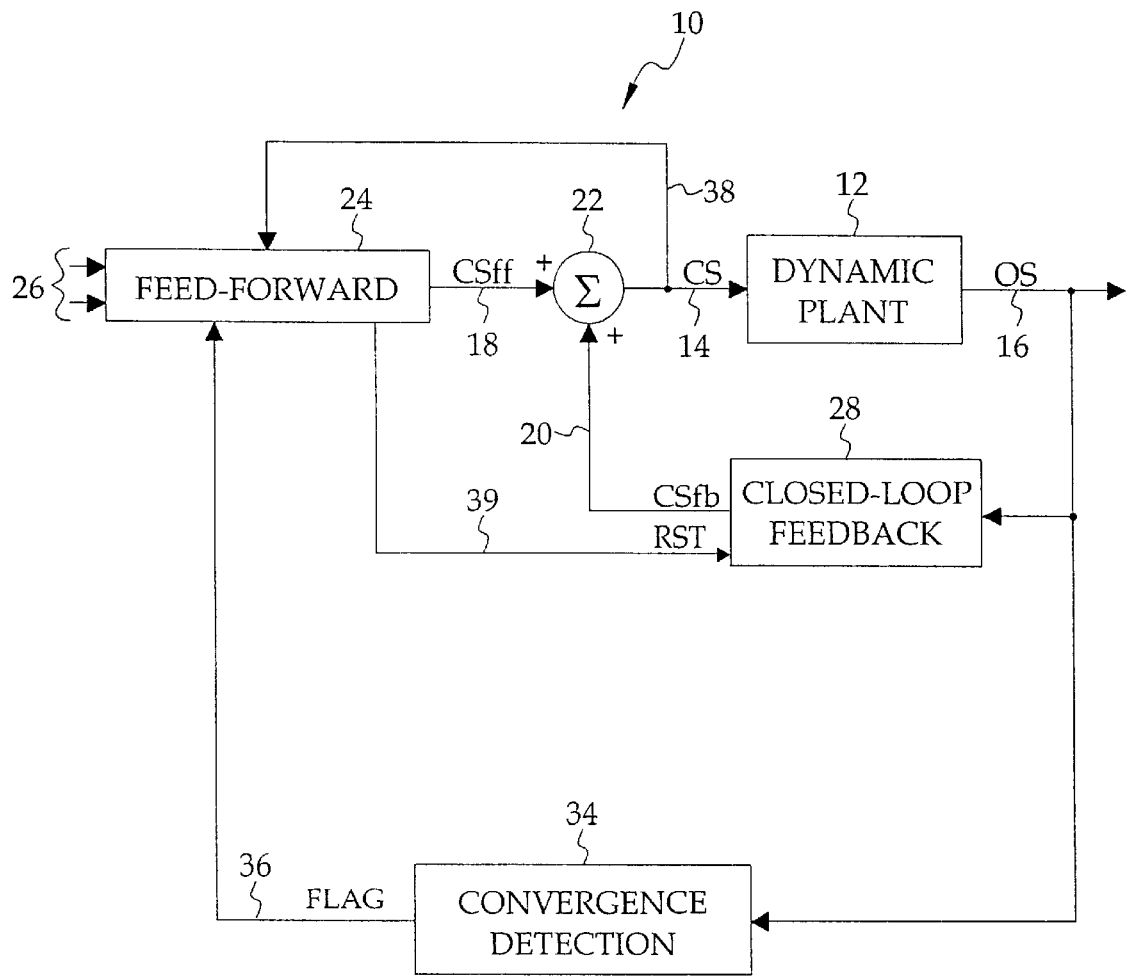
FIG. 1 is a block diagram of a control system including a signal processing for carrying out the method of this invention.

Referring to FIG. 1, the method of the present invention is described in the context of a control system 10 that regulates the operation of a dynamic plant 12. The control system 10 provides a control signal CS input to the plant 12 on line 14, and the plant 12 produces an output signal OS on line 16. The control signal CS comprises a feed-forward or open-loop component CSff on line 18 and a feedback or closed-loop component CSfb on line 20, with the summer 22 combining the components CSff and CSfb.

The feed-forward component CSff is produced by the Feed-Forward block 24 primarily in response to one or more inputs 26 which define or pertain to a desired operating condition of the plant 12. For example, if the plant 12 is a fuel injection system for a motor vehicle internal combustion engine, the inputs 26 would typically include operating signals such as engine speed and engine load. In general, the Feed-Forward block 24 generates a feed-forward control signal CSff on line 18 based on a stored function (which may be empirically and/or theoretically determined) that is designed to produce a desired operating condition of plant 12 under steady-state conditions. In the illustrated embodiment, however, Feed-Forward block 24 additionally has the capacity to alter or adapt the stored function, as explained below.

The feedback component CSfb of control signal CS is produced by Closed-Loop (CL) Feedback block 28 in response to an error signal generated inside block 28 based on the deviation of the existing state of plant 12 from a desired state. In general, the Feedback block 28 carries out a PI (proportional-integral) or PID (proportional-integral-differential) or similar control function in producing the feedback component CSfb so that the overall control signal CS is adjusted to drive the output signal OS or a internal state of plant 12 in a desired manner. In cases where the desired steady state output condition of plant 12 is not achieved due to an error in the feed-forward function of block 24 or a change in plant 12 due to wear, for example, the feedback component CSfb adjusts the overall control signal CS so that the desired steady state output condition is nevertheless achieved. In other words, CSfb can have a non-zero value under steady-state operating conditions of the plant 12.

As indicated above, the Feed-Forward block 24 of control system 10 has the capability of adjusting its component from time to time if the control signal CS actually required to achieve the desired steady-state operating condition of plant 12 differs significantly from the feed-forward control signal CSff. As mentioned, this can occur due to an error in the feed-forward component or a change in plant 12 due to wear, for example. To this end, the convergence block 34 monitors the plant output on line 16, and produces a flag output on line 36 to indicate whether a steady-state operating condition of plant 12 has been achieved. When the flag state indicates that the plant output has converged to a steady-state value, the feed-forward block 24 responds by sampling the control signal CS via line 38, and adjusting the feed-forward component so that CSff is more nearly equal to CS. At the same time, the integral component of closed-loop feedback block may be reset, as indicated by line 39. This sort of control or technique is commonly referred to as feedback learning or adaptive feed-forward control, and may be input condition specific, particularly in nonlinear control applications. Of course, there are many variations on this kind of control; for example, the convergence detection block can alternatively monitor the feedback control signal CSfb or the output of a plant state estimator for convergence on a steady-state value.

The present invention is directed to the functionality of Convergence Detection block 34, and in general to a method for determining and indicating if a dynamic signal has converged or settled to a steady-state or quasi-steady-state value. In real systems, the task of identifying signal convergence is made difficult by the presence of noise or jitter in the signal, and by the fact that the steady-state value often includes some variation with respect to time. In general, the method of the present invention addresses these difficulties by obtaining a measure of the signal variability or volatility, and using that measure to adjust the response of a filter on the signal. The filtered signal is compared to a window threshold, and the signal is deemed to have converged on a steady-state or quasi-steady-state value when the filtered signal is within the window for at least a given time interval. In a first embodiment of the invention, depicted in FIG. 2, a time-based derivative of the plant output signal is filtered with a Low-pass Filter 70, and the cut-off frequency of the filter 70 is adjusted in proportion to the measured variability of output signal OS. In a second embodiment of the invention, depicted in FIG. 3, the plant output signal OS is filtered with a High-Pass Filter 80, and the cut-off frequency of the filter 80 is adjusted inversely with respect to the measured variability of the output signal OS. In each case, the variability of the plant output signal OS is measured by computing a differential of the signal OS and then smoothing the differential.

Figure 2:
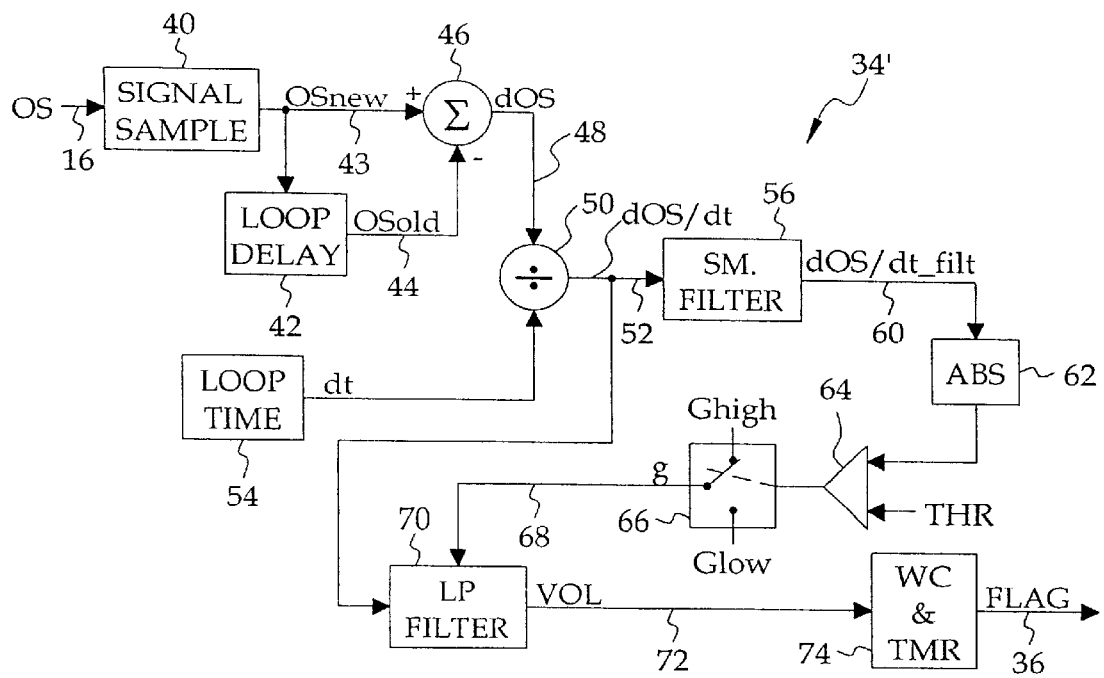
FIG. 2 is a signal processing block diagram according to a first embodiment of this invention.

In FIG. 2, a first embodiment of the Convergence Detection block 34 of FIG. 1 is designated as 34'. As in FIG. 1, the plant output signal OS appears as an input on line 16, and the convergence flag (FLAG) appears as an output on line 36. The block diagram is structured as a discrete implementation in which the plant output signal OS is periodically sampled by block 40; thus, the block 54 supplies a loop time or sample interval dt (denoting "delta time" or time step), and the block 42 provides a loop or interval delay function. Accordingly, the output of block 40 on line 43 is designated at the current or new value OSnew of the plant output signal OS, the output of block 42 on line 44 is designated as the previous or old value OSold of OS, and the summation block 46 computes the difference (OSnew−OSold) to form the output signal differential dOS on line 48. The division block 50 calculates the quotient (dOS/dt) which appears on line 52. Of course, if dt is a constant, the division block 50 may be eliminated. The differential dOS/dt is supplied as an input to both a Smoothing Filter 56 and a Low Pass (LP) Filter 70. The LP Filter 70 has a controlled cut-off frequency, and produces a measure VOL of the output signal volatility on line 72, whereas the Smoothing Filter 56 (which can also be characterized as a low-pass filter) has a fixed response, and produces a filtered signal dOS/dt_flit on line 60 for controlling the cut-off frequency of LP Filter 70.

In practice, Smoothing Filter 56 may be implemented as:

$$\text{FILT\_OUTnew} = [g * \text{FILT\_OUTold}] + [(1-g) * \text{FILT\_IN}] \quad (1)$$

where FILT_IN is the filter input on line 52, and FILT_OUTnew and FILT_OUTold are new and previous value of the filter output on line 60. The Absolute Value (ABS) block 62 rectifies the output of Smoothing Filter 56, and Comparator 64 compares the rectified filter output to a threshold THR. The switch 66 is controlled by the Comparator 64, and selects a gain term g for LP Filter 70. If the output of ABS block 62 exceeds THR, comparator 64 activates the switch 66 to set the gain term g equal to Ghigh; otherwise the gain term g is set to Glow. The gain term g has the effect of controlling the cut-off frequency of LP Filter 70, which, like Smoothing Filter 56, may be implemented as:

$$\text{FILT\_OUTnew} = [g * \text{FILT\_OUTold}] + [(1-g) * \text{FILT\_IN}] \quad (2)$$

In mechanizing the above-described embodiment, Ghigh may have a value that yields a cutoff frequency of 10 Hz., and Glow may have a value that yields a cutoff frequency of 1 Hz., for example. When the differential dOS/dt is higher than THR (indicating that output signal OS is still highly variable), g=Ghigh, causing the cutoff frequency of LP Filter 70 to be relatively high; this allows the volatility output VOL on line 72 to track the real movement of output signal OS. Conversely, when the differential dOS/dt is lower than THR (indicating that output signal OS is beginning to converge on a steady state value), g=Glow, causing the cutoff frequency of LP Filter 70 to be relatively low; this maximizes noise reduction while allowing VOL to quickly zero in on the steady-state motion of output signal OS. Of course, the gain term g could be smoothly adjusted between Ghigh and Glow, if desired. Finally, the volatility signal VOL on line 72 is supplied as an input to Window Comparator and Timer block 74, which sets the FLAG output on line 36 to indicate convergence on a steady state value if VOL is within a predefined window for at least a predefined time. When VOL is no longer within the predefined window, the block 74 resets the FLAG to indicate that the output signal OS is no longer converged on a steady state value.

Figure 3:
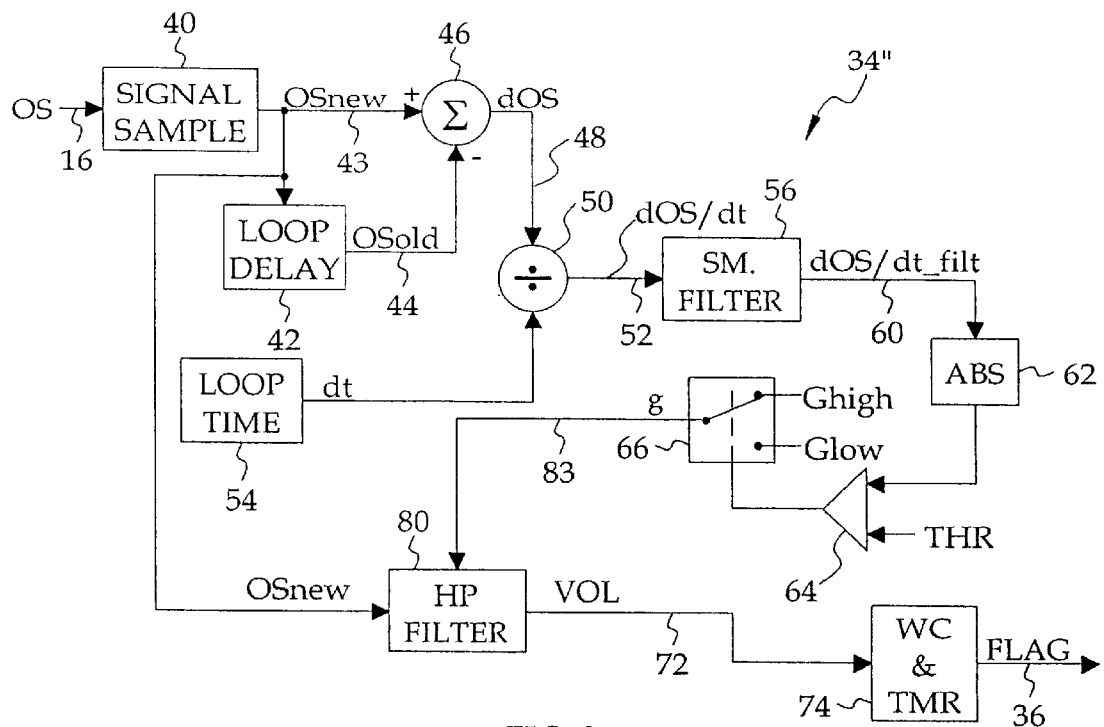
FIG. 3 is a signal processing block diagram according to a second embodiment of this invention.

In FIG. 3, a second embodiment of the Convergence Detection block 34 of FIG. 1 is designated as 34". Here, the volatility signal VOL on line 72 is produced by a High-Pass (HP) Filter 80 operating on the sampled plant output signal OSnew. In other respects, the various blocks of the second embodiment 34" are virtually identical to those of the first embodiment 34', and have been assigned the same reference numerals. As with the embodiment of FIG. 2, the gain term g has the effect of controlling the cut-off frequency of HP Filter 80, which may be implemented as:

$$\text{FILT\_OUTnew} = [g * \text{FILT\_OUTold}] + [k * (\text{FILT\_INnew} - \text{FILT\_INold})] \quad (3)$$

where k=(1+g)/2. In mechanizing such an embodiment, Ghigh may have a value that yields a cutoff frequency of 10 Hz., and Glow may have a value that yields a cutoff frequency of 1 Hz., for example. When the differential dOS/dt is higher than THR (indicating that output signal OS is still highly variable), g=Glow, causing the cutoff frequency of HP Filter 80 to be relatively low; this allows the volatility output VOL on line 72 to track the real movement of output signal OS. Conversely, when the differential dOS/dt is lower than THR (indicating that output signal OS is beginning to converge on a steady state value), g=Ghigh, causing the cutoff frequency of HP Filter 80 to be relatively high; this allows VOL to quickly zero in on the steady-state motion of output signal OS. As with the embodiment of FIG. 2, the gain term g could be smoothly adjusted between Ghigh and Glow, if desired.

In summary, the method of the present invention detects steady-state convergence of a signal by comparing a filtered version of the signal to a threshold over a given time interval, and adjusting the response of the filter based upon a measure of the signal volatility. In either of the two disclosed embodiments, the convergence of the signal on a steady-state or quasi-steady-state value is quickly and reliably identified, despite the presence of signal noise and steady-state signal fluctuations. While described in reference to the illustrated embodiment, it is expected that various modifications to the disclosed method will occur to those skilled in the art. For example, instead of monitoring the convergence of the plant output OS, one could monitor the convergence of an estimated internal plant state. Thus, it should be understood that methods incorporating these and other modifications may fall within the scope of this invention, which is defined by the appended claims.

What is claimed is:

1. A method of detecting steady-state convergence of a signal of a control system comprising the steps of:

differentiating and smoothing the signal to form a measure of the signal variability;

filtering the signal or its derivative With a filter having an adjustable cutoff frequency;

adjusting the cutoff frequency of said filter according to the measure of the signal variability; and detecting steady-state convergence of the signal when an output of said filter is below a predetermined threshold for at least a predetermined period of time.

2. The method of claim 1, including the steps of:

filtering a derivative of the signal with a low-pass filter having an adjustable cutoff frequency;

adjusting the cutoff frequency of the low-pass filter in direct relation to the measure of the signal variability.

3. The method of claim 2, including the steps of:

setting the cutoff frequency of the low-pass filter to a first value when the measure of the signal variability is above a predefined value; and setting the cutoff frequency of the low-pass filter to a second value that is lower than said first value when the measure of the signal variability is below the predefined value.

4. The method of claim 1, including the steps of:

filtering the signal with a high-pass filter having an adjustable cutoff frequency;

adjusting the cutoff frequency of the high-pass filter in inverse relation to the measure of the signal variability.

5. The method of claim 4, including the steps of:

setting the cutoff frequency of the high-pass filter to a first value when the measure of the signal variability is above a predefined value; and setting the cutoff frequency of the high-pass filter to a second value that is higher than said first value when the measure of the signal variability is below the predefined value.

\* \* \* \* \*